United States Patent [19]

Gray

[11] Patent Number: 5,316,715
[45] Date of Patent: May 31, 1994

[54] METHOD AND APPARATUS FOR PRODUCING MULTI-COLOR SHELLS UTILIZING AN INDEXING DIVIDER MOLD

[75] Inventor: John D. Gray, Union, N.H.

[73] Assignee: Davidson Textron Inc., Dover, N.H.

[21] Appl. No.: 881,724

[22] Filed: May 8, 1992

[51] Int. Cl.⁵ .................. B29C 39/12; B29C 41/18
[52] U.S. Cl. ........................... 264/245; 264/302;
264/310; 264/DIG. 60; 425/130; 425/134;
425/257; 425/258; 425/425; 425/435; 425/447;
425/DIG. 47; 425/425; 425/435; 425/447;
425/DIG. 47
[58] Field of Search .............. 264/245, 255, 301, 302,
264/304, 306, 310, DIG. 60; 425/434, 435, 425,
447, DIG. 47, 134, 130, 257, 258

[56] References Cited

U.S. PATENT DOCUMENTS

| | | |
|---|---|---|
| 3,123,403 | 3/1964 | Hood . |
| 4,217,325 | 8/1980 | Colby ........................ 264/303 X |
| 4,335,068 | 6/1982 | Hemery . |
| 4,562,025 | 12/1985 | Gray . |
| 4,692,293 | 9/1987 | Gray ....................... 264/DIG. 60 X |
| 4,790,510 | 12/1988 | Takamatsu et al. .... 264/DIG. 60 X |
| 4,925,151 | 5/1991 | Gray . |
| 5,033,954 | 7/1991 | Kargarzodeh ................. 264/245 X |
| 5,074,773 | 12/1991 | Tischler .................. 264/DIG. 60 X |
| 5,093,066 | 3/1992 | Batchelder et al. ............ 264/302 X |
| 5,137,679 | 8/1992 | Tibbetts et al. ................. 264/304 X |

FOREIGN PATENT DOCUMENTS

| | | | |
|---|---|---|---|
| 2802237 | 7/1978 | Fed. Rep. of Germany ...... 264/245 |
| 3067620 | 3/1991 | Japan .................................. 264/245 |

Primary Examiner—Karen Aftergut
Attorney, Agent, or Firm—Reising, Ethington, Barnard, Perry & Milton

[57] ABSTRACT

An apparatus and process for manufacturing multiple thin walled hollow shells for parts such as automobile door panels, arm rests, and instrument panels from thermoplastic plastisol includes a pair of plastisol charge boxes each forming a separate compartment and members for joining the charge boxes with an open ended mold. The mold has a divider rib thereon that is inaccessible by straight vertical engagement of a seal assembly on the divider. An indexable divider wall is operatively connected between the charge boxes so that the divider wall can be selectively extended and retracted at an angle with respect to the vertical and against the mold at the divider rib thereon for allowing separation of the casting surfaces having different colors fixed thereon and the subsequent fusing of the casting surfaces to one another at the divider.

13 Claims, 3 Drawing Sheets

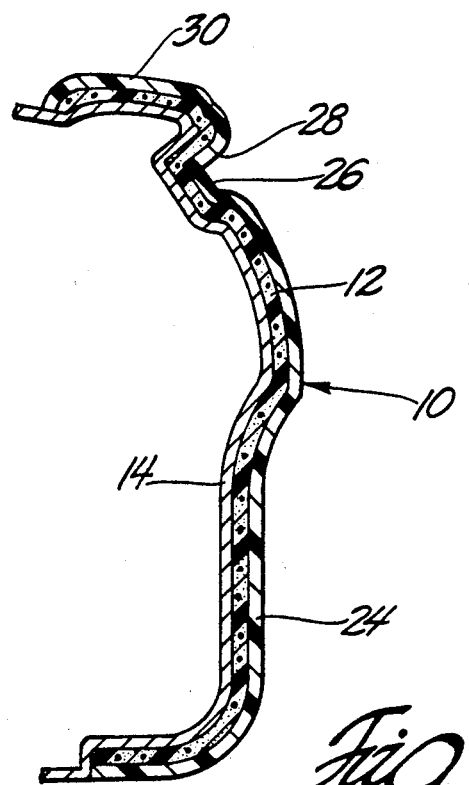
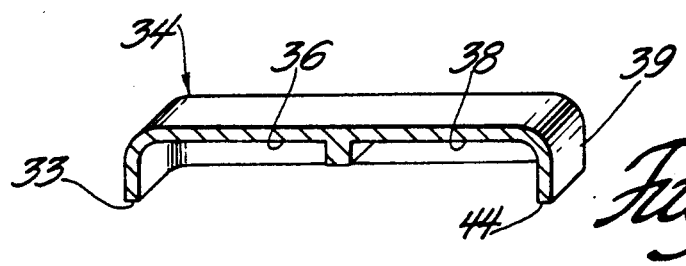
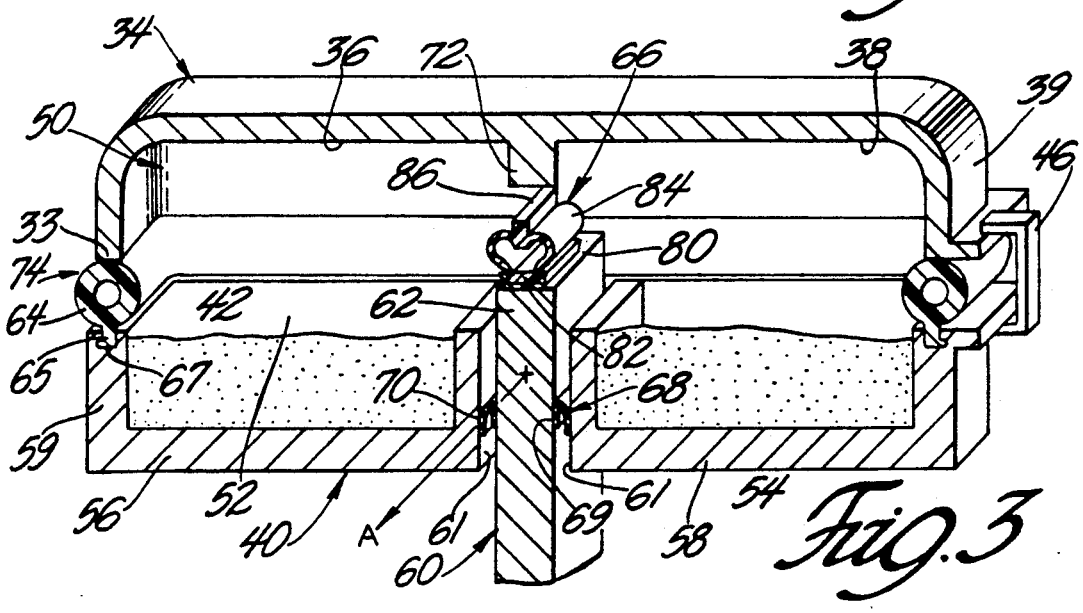

METHOD AND APPARATUS FOR PRODUCING MULTI-COLOR SHELLS UTILIZING AN INDEXING DIVIDER MOLD

TECHNICAL FIELD

This invention relates to a method and apparatus for making plastic shell articles suitable for use in automobile trim components, such as interior door panels, and more particularly to two-tone plastic shells.

BACKGROUND OF THE INVENTION

The automotive industry has used of interior trim components such as composite plastic door panels comprising a polyvinyl chloride outer shell. See for example the trim components disclosed in U.S. Pat. No. 3,123,403. The acceptance of such components has been because interalia this type of construction permits a wide latitude in styling, color, and grain effects which are most desired particularly in the interior design of automobiles.

A pre-formed vinyl shell is made from dry thermoplastic powder particles which are applied to a heated shell mold from a powder box to form a continuous monochromatic one piece shell. Two or more colors of thermoplastic powder from separate compartments of charge boxes may be applied to heated shell molds in separate portions thereof to provide a one piece shell with two or more color tones to enhance the decor of the interior of an automobile. This type of system is disclosed in U.S. Pat. No. 4,562,025, issued Dec. 31, 1985 and U.S. Pat. No. 4,925,151, issued May 15, 1991, both in the name of Gray and assigned to the assignee of the subject invention. A problem with this type of apparatus and method is that the height of the divider wall is fixed and therefore requires a fixed shaped charge box divider wall and also straight and vertical engagement of the two-tone sealing assembly at the mold's two-tone line. Furthermore, such systems do not permit sealing mold divider ribs that are inaccessible to straight line vertical divider wall sealing systems of the type shown in the aforedescribed '025 and '151 patents.

The prior art shows that movable partitions in other types of molds are known, as illustrated in U.S. Pat. No. 4,335,068, issued Jun. 15, 1982 in the name of Hemery. The patent relates to a method of molding containers from two different plastic materials of different color wherein the material is injected into a space provided between the walls of a mold and a counter mold. Removable separators define first and second subspaces within the space to allow different color injection. However, such movable separators are not suitable for sealing mold divider ribs of the type shown in the '025 and '151 patents especially when such ribs are inaccessible to straight vertically aligned sealing systems.

SUMMARY OF THE INVENTION

The invention includes a method of molding a single piece multi-color plastic shell which includes the steps of heating an open ended mold to a temperature near the fusing temperature of plastisol material, disposing the mold vertically above charge box means having at least two color plastisol sources and having an extendable divider wall, vertically connecting the charge box means to the mold to form a partially sealed closed system, extending the divider wall relative to the charge box means to form a fully sealed closed system by positioning the divider wall in sealed contact with the mold so as to separate the mold into first and second color casting surfaces, and thereafter rotating the charge box means and mold in a powder casting sequence to release plastisol charges of separate colors onto each casting surface by gravity to build up a shell of desired shape and size. In a preferred embodiment, the extending step is along a path inclined at an angle with respect to the vertical so as to seal a mold divider rib inaccessible by movement of a divider wall in the vertical direction.

The invention also includes an apparatus for molding a thin walled plastic shell in an open ended mold having heating means connected thereto for heating and fusing plastisol material on the mold. The apparatus includes the open ended mold having first and second casting surfaces and the open ended charge box means having first and second open ended compartments each having a predetermined charge of plastisol of different color. Also included is means for joining and sealing the mold against the charge box means with the first compartment in communication with the first casting surface and the second compartment in communication with the second casting surface. The invention is characterized by the charge box means including extendable divider means slidably and sealingly connected between the compartments for retracting and extending with respect to the compartments to contact the mold at a divider rib therein to separate the casting surfaces. In a preferred embodiment the extendable divider means is angularly inclined with respect to the draw direction of the powder boxes to provide sealing engagement between a divider rib surface in a plane perpendicular to the angle of inclination.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of a single-piece multicolor panel of the present invention shown with associated component parts of an automotive vehicle door panel;

FIG. 2 is a perspective sectional view of an exemplary mold of the subject invention;

FIG. 3 is a diagrammatically shown sectional perspective view of a powder box sealed to the mold of FIG. 2 in a pre-release position with the divider wall retracted;

DESCRIPTION OF THE PREFERRED EMBODIMENT

Figure 4:
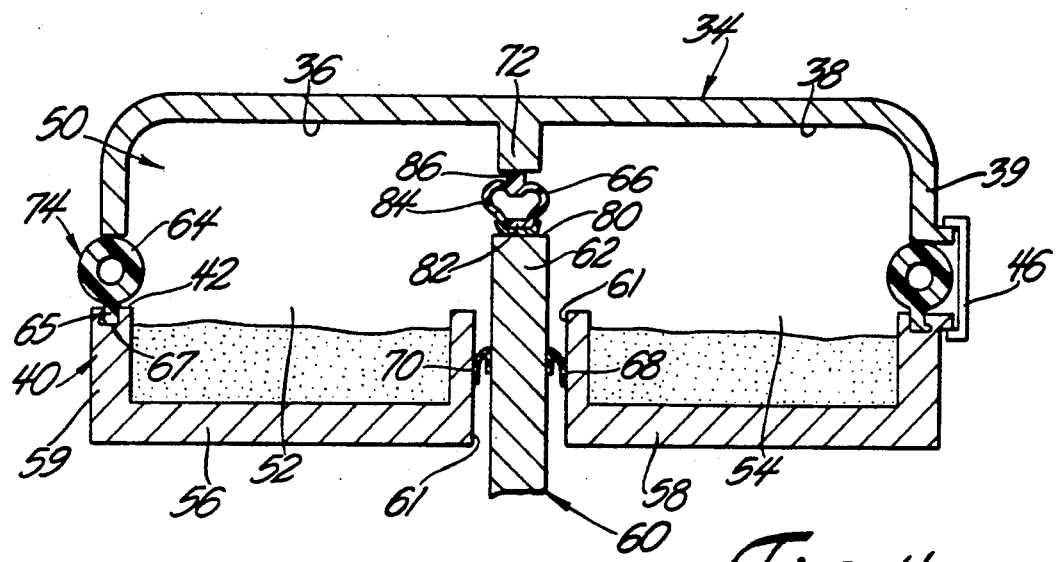
FIG. 4 is a diagrammatically shown sectional view showing the powder box and mold in the pre-release position with the divider wall extended.

The invention will be hereinafter described with reference to the production of plastic thin walled shells for a typical automotive part, such as an interior door panel, consoles and instrument panels. FIG. 1 shows a typical automobile panel application of a multi-color, single piece interior plastic shell 10. The shell 10 is preferably made of a polyvinyl chloride material, and is backed by a layer of polyurethane foam 12 bonded to the shell 10 by a mold process such as in U.S. Pat. No 3,123,403, issued Mar. 3, 1964 for an automobile armrest. An interior reinforcing insert 14 is connected thereto. Specifically, the door panel illustrated is a General Motors design for Buick "N" door panel.

In accordance with the present invention, the shell 10 is a one piece plastic part with an integral lower panel 24 of a dry cast plastic having a first color. The shell 10 includes an integral joint 26 which is at the base of a recessed groove 28. The groove 28 forms a transition to an integrally formed upper panel 30 comprising an armrest segment formed of dry cast plastic having a second color contrasting or complimenting the color of the first panel 24 or other interior components.

One embodiment of the invention includes an open ended heated mold 34 having first and second casting surfaces 36, 38 diagrammatically illustrated in FIG. 2. It is to be understood that the mold 34 can be configured in any shape corresponding to the desired shape of the final shell 10. A generally rectangular mold 34 is utilized to illustrate the invention with it being understood that other compound surfaced molds are contemplated, as will be later described in FIG. 6, for use in manufacturing door panels, such as shown in FIG. 1. In FIG. 2, the mold 34 is shown as including a divider rib 72 which divides the color between the two casting surfaces 36, 38. The mold 34 includes four side walls 39 surrounding the casting surfaces 36, 38 providing a cavity therein with an open end 44. The divider rib 72 defines a sealing surface 72a that later serves as a casting surface for forming a bonded connector between different colored panels as more specifically discussed in U.S. Pat. No. 4,925,151 assigned to the assignee herein and incorporated by reference herein.

An open ended charge or powder box means 40 (FIG. 3) is operated between raised and lowered positions with respect to the mold 34 by suitable handling equipment, one type of which is specifically set forth in U.S. Pat. No. 4,664,864, issued May 12, 1987, assigned to the assignee of the subject invention, and is incorporated by reference herein. The charge box means 40 includes an open end 42 which is configured to cover the planar extent of the open end 44 of the mold 34. Clamp means 46 joins and secures the powder charge box means 40 to the mold 34 when the box means 40 is elevated to the position shown in FIGS. 3 and 5, herein referred to as the mold-up position. As a result, the interior of the charge box means 40 and the interior of the mold 34 form a closed system 50 having separate color powder charges in the powder box means 40. The basic system of the two-tone configuration of the charge box and mold is disclosed in U.S. Pat. No. 4,925,151 set forth in the Background of the Invention, and incorporated by reference herein.

The open ended charge box means 40 has first 52 and second 54 open ended compartments each having a predetermined charge of plastisol of different color therein. With the mold 34 connected to the charge box 40, the first compartment 52 is in communication with the first casting surface 36 and the second compartment 54 is in communication with the second casting surface 38.

The charge box means 40 comprises two separate charge boxes 56, 58 establishing the first compartment 52 and second compartment 54, respectively, for containing the separate colors of plastisol. The charge boxes 56, 58 are diagrammatically illustrated as being rectangular in shape to form the closed system 50.

The perimeter of the charge box means 40 includes sealing means 74 which is designed to contact with the sealing surfaces 33 of the mold 34 providing sealing connection therebetween. The exterior walls 59 of charge boxes 56, 58, i.e., three walls on each box, include side wall gaskets 64 secured thereto to provide a pressure seal against the edges 33 of the walls 39 of the mold 34. The configuration of the side wall gaskets 64 in combination with the charge boxes 56, 58 is disclosed in the referenced U.S. Pat. No. 4,925,151. The gaskets 64 are secured by their base 65 within a groove 67 of the walls 59.

The charge box means 40 includes extendable divider means 60 slidably connected between the compartments 52, 54 and charge boxes 56, 58 for retracting and extending with respect to the charge boxes 56, 58 to contact the mold 34 to separate the casting surfaces 36, 38. The divider means 60 includes a slidable wall 62 slidably retained between the charge boxes 56, 58. The wall 62 separate the two compartments 52, 54 each containing the charge of plastic powder material of different color. The slidable wall 62 includes a contact edge 80 which includes a compression seal 66 at the edge thereof for contact sealing against the mold 34. The compression seal 66 includes a base 82 fixedly or slidably secured to the edge 80 of the wall 62, a compressionable tubular seal portion 84, and a seal rib 86 extending therefrom with a surface 86a that covers and sealingly engages the divider rib surface 72a.

The divider means 60 also includes wiper means 68 between the divider wall 62 and the charge boxes 56, 58 for preventing the plastisol from exiting the charge or powder boxes 56, 58. More particularly, the wiper means 68 comprises two longitudinally extending seals having bases 69 which are fixedly connected to the wall 62 on opposing sides thereof and having free end 70 which wipe against and are in compression with the interior wall 61 of the charge boxes 56, 58. The longitudinal length of the divider wall 62 is sized to extend between and within the walls 39 of the mold 34 in sliding contact therewith such that the divider wall 62 may extend into the mold 34 to contact the mold rib 72 to maintain the division between the casting surfaces 36, 38.

The divider wall 62 and compression seal 66 contact the rib 72 on the mold 34 which establishes the location of change of color. The divider wall 62 allows for freedom of the configuration of the mold 34 with respect to the charge box 40 to allow assembly at various angles and panel heights. Furthermore, the powder boxes 56, 58 on each side of the divider wall 62 now become independent and can be independently removed from the apparatus if it is desired to change one or more of the powder colors during a production run. Furthermore, the seal 66 can have a height that will compress when it engages the divider rib 72 as the divider wall 62 moves and the divider wall 62 can compress the seal 66 against the mold 34 to compensate for differences in dimensional tolerances between the powder box and mold components of the apparatus.

Figure 5:
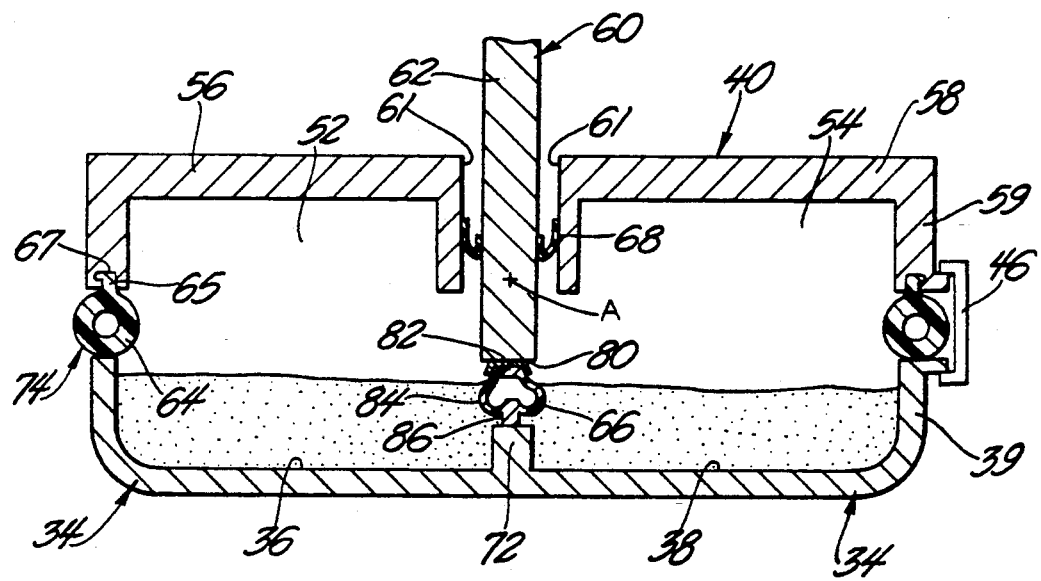
FIG. 5 is a diagrammatically shown sectional view showing the powder box and mold in the powder release orientation.
Figure 6:
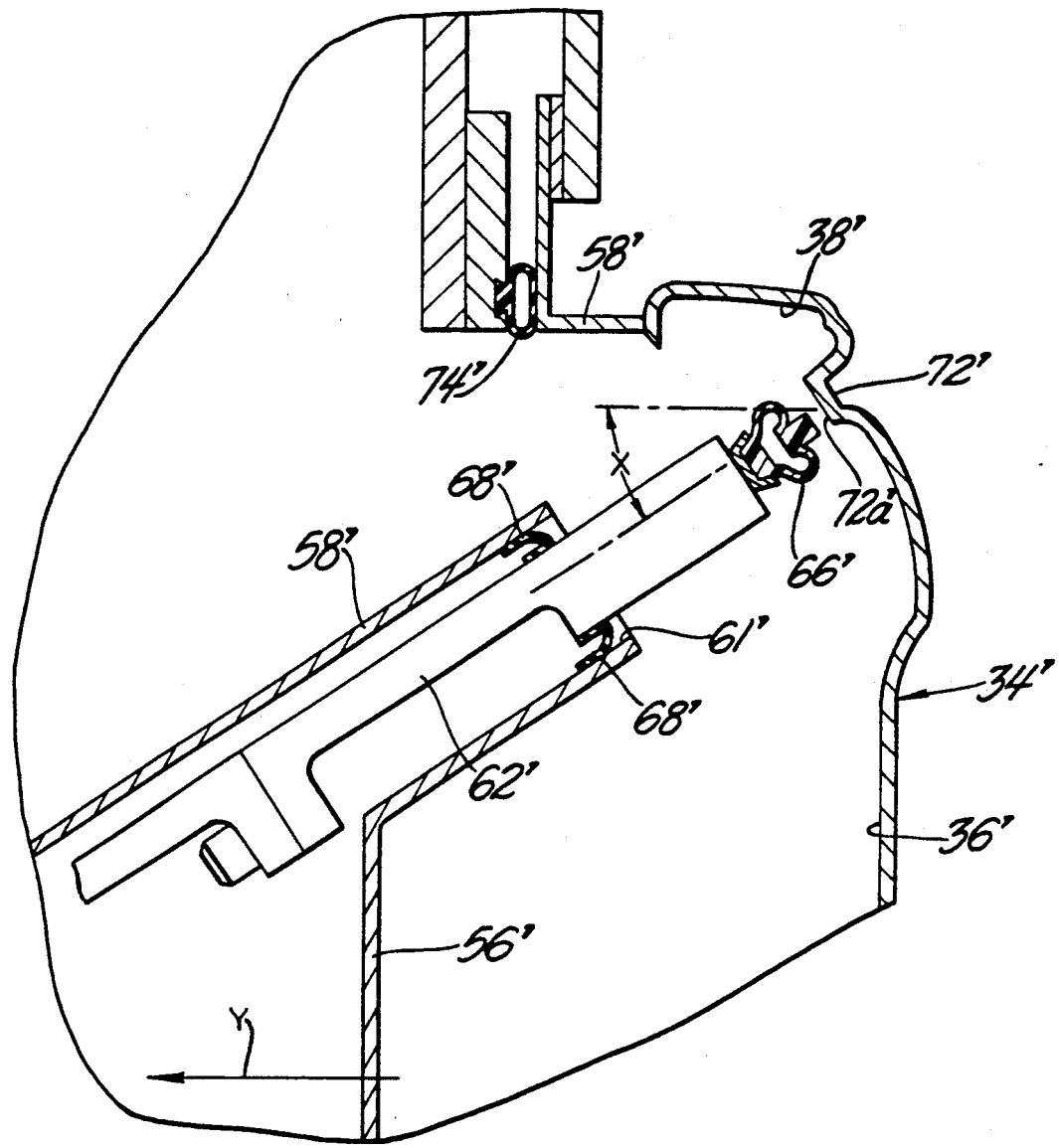
FIG. 6 is a fragmentary, sectional view of apparatus embodying the best mode for manufacturing the multicolor panel of FIG. 1.

The best mode apparatus for manufacturing the shell 10 is shown in FIG. 6 as including components like those in FIG. 5 identified by like reference numerals primed. In this embodiment the divider rib seal surface 72a' is arranged in a plane perpendicular to an inclined divider wall draw angle X. The angle X enables divider wall 62' to be extended following movement of the powder boxes 56', 58' along the usual vertical draw direction Y so as to locate the seal 66' thereon in sealing engagement with the surface 72a'. The location of the surface 72a' is inaccessible to the vertically disposed divider wall constructions used in prior art apparatus.

In the method of the subject invention, the powder box 40 is operated between raised and lowered positions. The open ended mold 44 is heated to a temperature near the fusing temperature of the plastisol material. Thereafter, the mold 34 is disposed vertically above the charge box means 40. The charge or powder box means 40 is connected to the mold 34 by the clamp 46 to form the closed system 50 as illustrated in FIG. 3. Thereafter, the divider wall 62 and seal 66 are extended relative to the charge box means 40 to contact the mold 34 and separate the mold 34 into the first and second color casting surfaces 36 38 as illustrated in FIG. 4.

The next step includes concurrent rotation of the closed system 50 by drive means of the type set forth in U.S. Pat. No. 4,664,864 through 180° relative to FIG. 3 position about axis A. Thereafter, the charge box means 40 will be located vertically over the mold 34 as illustrated in FIG. 5. A fill step of the process takes place in which the thermoplastic powder is distributed evenly throughout the mold open end. A resultant even build-up of plastic powder occurs on the preheated mold surfaces 36, 38 of the mold 34. Following the fill steps, the joined mold 34 and charge box 40 are again rotated 180° so that the mold 34 is located vertically above the box 40 in the mold-up position. An air jet system of the type shown in U.S. Pat. No. 4,664,864 may be used to dislodge excess powder from the walls of the mold 34 so that the dislodged material will flow by gravity return to the interior of the box means 40 for collection and reuse in the system.

A powder fuse cycle is then carried out in accordance with well known practices in the art wherein the mold powder is completely fused into the desired thin walled hollow part. Before the fuse cycle, the charge box is unclamped from the inverted mold 34 and the box 40 is returned to a powder mold-up position. Thereafter, the mold 34 with the powder cast to the surface is heated further to fuse the powder, then is cooled and rotated 180°. into a strip position corresponding to the mold down position. Make-up powder or appropriate color is fed to the multiple separate color compartments.

Depending on the rib 72 design, the fusing step may fuse together the separated casting surfaces 36, 38 upon removal of the powder box means 40 and further heating. Alternatively, the powder box means 40 may remain clamped to the mold 34 during the fusing step. Thereafter, the divider wall 62 may be retracted and the system 50 rotated 180° to the mold-down position to allow powder to fall and join the casting surfaces along the divider line. Thereafter, the system may be again rotated 180° to the mold-up position, the powder box 40 removed, and final fusing.

A typical powder cast process for a two color door panel includes the following sequence.
1. Preheat tool and oven to temperature between 250° F. and 390° F.
2. After mold cast temperature is reached, fill the plastisol in the powder boxes 56, 58 and attach the powder boxes 56, 58 to the mold 34.
3. Extend the divider wall 62 between the boxes 56, 58 and contact the mold 34.
4. Rotate the boxes 56, 58 and the mold 34 one and a half turns clockwise (540°) and one turns counter clockwise.
5 Dwell time of approximately 8 seconds (for additional part thickness, add dwell time).
6. Rotate 180° F. and unclamp.
7. Return the mold 34 to a cure oven and heat for 2.5 minutes in the mold-down position and 2.5 minutes in the reverse mold-up position.

Examples of suitable mold heating processes for use with the process and apparatus of the present invention include mold temperature control by heated and cooled air or oil heating and cooling flow as set forth in U.S. Pat. No. 4,217,325, issued Aug. 12, 1980 to D. Colby. Suitable thermal plastic powders include plastisized polyvinyl chloride and related vinyl resins in dry powder form for ease of gravity flow from the powder charge box 40 during both fill and return steps. Typical examples of the parts, plastic materials and mold process includes the following. Parts that have been made by the PVC powder molding process include a door panel shell having a mold volume or approximately 6 cubic feet.

PVC resin, plasticizer, stabilizer, release agents and color pigments are combined in a high intensity mixer to produce a dry, flowable powder for each desired color. The process is known in the industry as dry blending.

The various compounds components may be selected as to type and ratio to provide the properties required both for the finished product and for ease of processing. Physical properties will not be dissimilar from those obtained with liquid plastisol which is also used to manufacture similar products but has an inherent weakness for forming objectional drips and runs when made in complex shapes.

Processing properties are such that when melting of the plastic powder occurs, densification results in exact reproduction of minute details, such as grain marks and stitches engraved in the mold surface.

Mold preheating temperature may range from 250° F. to 390° F. Since the thickness of the finished product is also governed by the time that the powder contacts the mold, it should be understood that simultaneous charge of the powder to the mold can be of definite advantage. Also, certain areas of the mold can be made to have a lower preheated temperature than others, which will permit molding of a thinner shell in those areas, since both temperature and mold fill time determine the final thickness of the shell. Therefore, a variable flexible range, for mold filled time, of 1 second to 10 seconds or more has been established.

Depending on formulation, complete melting or fusion of the PVC powder can occur when the temperature reaches 350° F. to 450° F. After fusion, the mold 34 is cooled to a temperature which will facilitate removal from the shell 10 without damage.

Specifically, the process and apparatus of the present invention enable even and complete distribution of the thermal plastic powder material to mold surfaces to form large, long, thin walled single-piece two color mold shells for interior door panels and the like formed during short cycle mold cycles and limited plant floor space.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of molding a single-piece multi-color plastic shell, the method including the steps of:
   heating an open-ended mold to a temperature near a fusing temperature of a plastisol material,
   disposing the mold vertically above charge box means having at least two color plastisol sources and having an extendable and movable divider wall between the two color plastisol sources;
   moving the mold against the charge box means in a predetermined draw direction,
   connecting the charge box means to the mold to form a closed system with the divider wall separated from the mold,
   moving and extending the divider wall relative to the charge box means to contact the mold and separate the mold into first and second color casting surfaces,
   thereafter rotating the charge box means and mold in a powder casting sequence to concurrently release plastisol charges of separate colors onto each casting surface by gravity to build up a single piece multi-color plastic shell of desired shape and size on the casting surfaces of the mold.

2. A method as set forth in claim 1 further including providing independent and separately removable powder boxes for the two color plastisol sources of the charge box means for allowing independent removal and change of the plastisol therein, with the divider wall extending therebetween.

3. A method as set forth in claim 2 further including sealing an area between the powder boxes and divider wall to prevent plastisol from escaping the closed system.

4. A method as set forth in claim 1 further including providing the mold with a divider rib having a sealing surface inclined with respect to the predetermined draw direction, and extending the divider wall in a direction inclined to the predetermined draw direction.

5. An apparatus for molding a thin-walled plastic shell of plastisol in an open-ended mold adapted for heating and fusing plastisol material cast therein, the apparatus comprising:
   an open-ended mold having first and second casting surfaces,
   open-ended charge box means having first and second open end compartments each having a predetermined charge of plastisol of different color contained therein,
   means for joining and sealing the mold against the charge box means in a predetermined plane with the first compartment in communication with the first casting surface and the second compartment in communication with the second casting surface, and
   the charge box means including extendable divider means slidably connected between the compartments for retracting and extending with respect to the compartments in a predetermined direction so as to contact the mold and thus separate said casting surfaces when the divider means is in an extended position with respect to the compartments and so as to separate from the mold when the divider means is in a retracted position with respect to the compartments.

6. An apparatus as set forth in claim 5, the extendable divider means angularly inclined with respect to the predetermined plane.

7. An apparatus as set forth in claim 5 wherein the divider means includes a slidable wall slidably retained between the compartments and a compression seal at an edge of the slidable wall for contact sealing against the mold.

8. An apparatus as set forth in claim 7 wherein the charge box means comprises two separate charge boxes for containing separate colors of plastisol, the divider means including wiper means between the slidable wall and the charge boxes for preventing the plastisol from exiting the charge boxes when the change box means and mold are joined and sealed.

9. An apparatus as set forth in claim 7, the extendable divider means angularly inclined with respect to the predetermined plane.

10. An apparatus as set forth in claim 8, the extendable divider means angularly inclined with respect to the predetermined plane.

11. A method as set forth in claim 1 further including providing the mold with a divider rib having a sealing surface parallel with respect to a plane perpendicular to the predetermined draw direction.

12. A method as set forth in claim 1 further including moving and extending the divider wall and a seal attached thereto relative to the charge box means to contact the mold and separate the casting surfaces.

13. An apparatus as set forth in claim 5 wherein the divider means includes a divider wall and a seal connected to the divider wall for moving and sliding together between the extended position and the retracted position of the divider means.

* * * * *